Aug. 25, 1959 H. A. MILOCHE 2,901,547

SWITCHING SYSTEM NETWORK

Filed June 28, 1955 2 Sheets-Sheet 1

INVENTOR
H. A. MILOCHE
BY [signature]
ATTORNEY

Aug. 25, 1959 H. A. MILOCHE 2,901,547

SWITCHING SYSTEM NETWORK

Filed June 28, 1955 2 Sheets-Sheet 2

INVENTOR
H. A. MILOCHE
BY
[signature]
ATTORNEY

United States Patent Office 2,901,547

Patented Aug. 25, 1959

2,901,547

SWITCHING SYSTEM NETWORK

Herman A. Miloche, Teaneck, N.J., assignor to Bell Telephone Laboratories, Incorporated, New York, N.Y., a corporation of New York Application June 28, 1955, Serial No. 518,480

17 Claims. (Cl. 179—27.54)

This invention relates to electronic coordinate-type switching devices, and more particularly to the physical arrangement and structural mounting of the components thereof.

Basic circuitry underlying coordinate switching devices, together with certain physical embodiments thereof, are well known in the art, illustrative of which are those disclosed in Patent No. 1,131,734 granted to John N. Reynolds on March 16, 1915. Similarly, the use of gas discharge tubes as active switching elements in these devices is known, as will be recognized from the subject-matter disclosed in Patent No. 2,684,405 granted to E. Bruce et al. on July 20, 1954. The subject-matter of this invention, therefore, relates to improvements of structures embodying known circuitry.

Objects of this invention are to lower cost of manufacture, facilitate assembly and disassembly for repair and maintenance, and reduce space required for mounting electronic crosspoint devices.

In accordance with one feature of this invention, equally spaced parallel conductive metal rods are provided to serve as connectors between the crosspoints, thereby advantageously eliminating the conventional interconnecting wiring.

In accordance with another feature of this invention, groups of gas discharge tubes are mounted in alignment upon rectangular supporting members, which members are themselves detachably fastened and connected by clips to the aforementioned metal rods, thereby facilitating assembly and disassembly for manufacture, repair and maintenance.

In accordance with yet another feature of this invention, a first plurality of rectangular members are arranged upon the bars with their axes parallel, and a second plurality of similar rectangular members are arranged upon the bars with their axes at right angles to the axes of the first plurality, whereby connections are made from the crosspoint devices of the first plurality to the crosspoint devices of the second plurality through the aforementioned clips and aligned metal bars.

In order that the invention may be more clearly understood, apparatus, in accordance therewith is hereafter described by way of example, with reference to the drawing in which.

Figure 1:
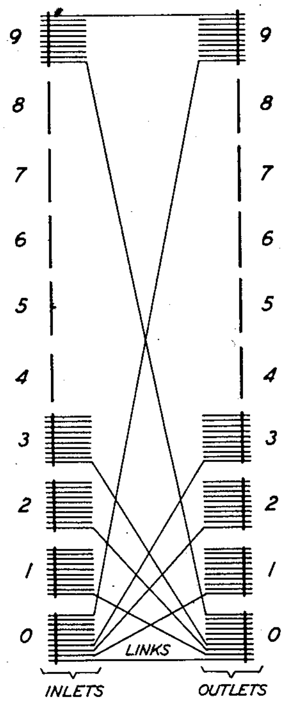
Fig. 1 is a schematic diagram of an elementary segment of the basic circuitry underlying the invention.

Referring now to Fig. 1, it will be noted that ten inlets and ten outlets are shown. Each inlet and each outlet terminal is commonly connected through ten crosspoints to ten links which, in turn, are so interconnected as to give each inlet access to all outlets. For example, one link is connected from inlet terminal 0 to each of the outlet terminals, links to outlets 4, 5, 6, 7 and 8 being omitted to avoid congestion on the figure. Each of the inlet terminals, therefore, has access to all of the outlet terminals and vice versa.

Figure 2:
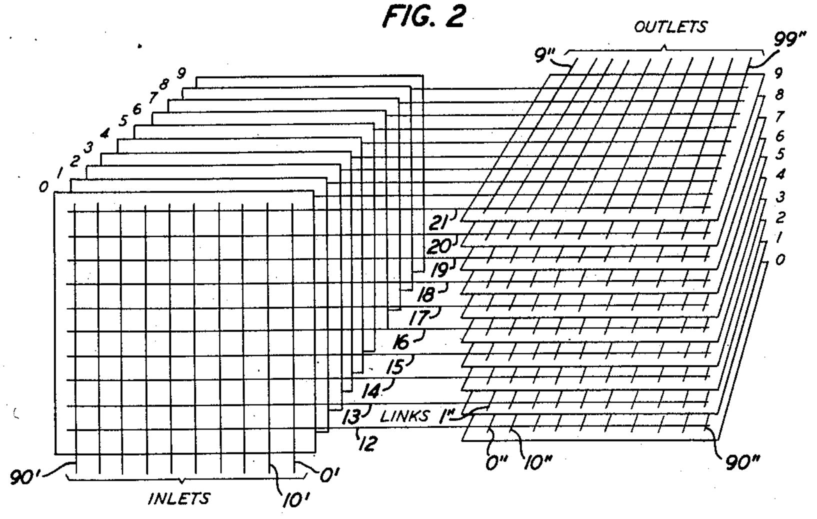
Fig. 2 is a diagram of an extension and adaptation of the basic circuitry of Fig. 1 to the subject invention.

In the quasi-physical presentation of Fig. 2, the inlet and outlet terminals of Fig. 1 are increased in number to 100 each, and are arranged in right angularly disposed planes, thereby permitting the use of straight conductors for interconnection. Thus inlet terminal 0′ of Fig. 2 corresponds to inlet terminal 0 of Fig. 1, and behind terminal 0′, hidden from view, lie the nine remaining inlet terminals corresponding to terminals 1 to 9.

As hereinbefore noted, inlet conductor 0′ crosses at right angles to each of ten link conductors 12 to 21. At each junction an electronic connection is made, thereby providing, when the electronic elements are operated, ten paths leading from inlet terminal 0′ to ten outlets corresponding to outlets 0 to 9 of Fig. 1; outlet conductors 0″ to 9″ in Fig. 2 corresponding to outlets 0 to 9, respectively, in Fig. 1. Thus a path is established from inlet conductor 0′ through link conductor 12 to outlet conductor 0″, and similar paths are established from inlet conductor 0′ via links 13 to 21 to outlet conductors 1″ to 9″, respectively.

In Fig. 2, additional paths may be completed from inlet terminal 0′ (and each of the remaining inlet conductors) to outlet conductors 10″ to 99″ via the hereinbefore mentioned electronic elements and link conductors.

The crosspoints depicted in Fig. 1 relate to the basic design incorporating but ten inlets and ten outlets. However, in telephone switching systems it is usually desirable to provide hundreds or thousands of crosspoint connections. The basic circuit of Fig. 1 is, therefore, logically expanded in Fig. 2, as stated above, to provide 100 switching paths by adding the remaining inlet and outlet conductors therein portrayed. Paths are provided from any one of 100 inlets via 100 links to any one of 100 outlets, provision being made to prevent completion of unwanted paths by the insertion of 2,000 gas discharge tube path-completing devices, one such device being inserted at each of the 2,000 points at which a link crosses an input or output conductor. This is more particularly illustrated in the physical embodiment of Fig. 3.

Figure 3:
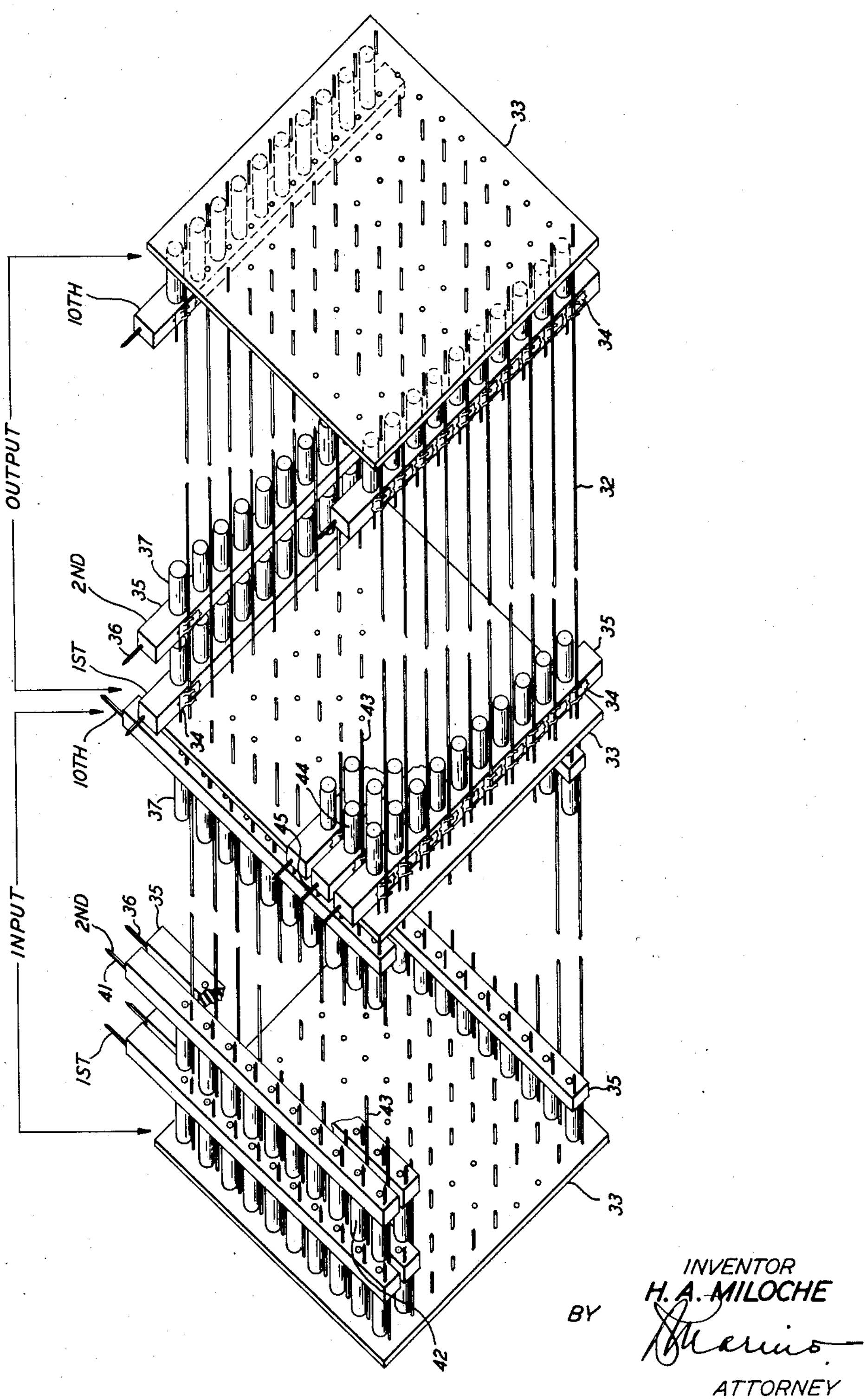
Fig. 3 is a perspective view of a partly assembled embodiment of the invention.

In said Fig. 3, it will be noted that 100 electrically conductive metal bars 32 are parallelly disposed in a square cross-sectioned configuration, and are supported and retained in position by the three insulating plates 33. These 100 bars correspond to the 100 links depicted in Fig. 2. Supported upon the bars 32 and attached thereto by clips 34 are rectangular members 35, upon each of which are mounted 10 gas tube crosspoint devices 37, as illustrated in detail in Fig. 4. One terminal of each of the 10 tubes is commonly connected to the input or output stud terminal 36 by the conductor 39, and the remaining terminal of each tube is individually connected to the clip associated therewith in the manner depicted in Fig. 4. When installed with the clips 34 connected to the bars 32 in the manner shown, a possible path exists from the input terminal through any one of the ten tubes connected thereto, to any one of the associated ten bars. Thus, each member 35 corresponds to one of the input or output conductors of Fig. 2.

Further examination discloses that the device of Fig. 3 is divided into two main bays, an input bay and an output bay. Each bay contains a total of 100 rectangular members 35 which correspond to the 100 inlet and 100 outlet conductors of Fig. 2.

It is not of the essence of the invention that the members 35 be mounted upon the bars 32 at right angles thereto, nor that the bar group cross-section should constitute a square. The members 35 may be arranged obliquely across the bars, in which event it may be required to extend the bays to accommodate the full complement. Similarly, the bars may be arranged to present, in cross-section, the shape of a parallelogram. It should be noted, however, that in embodiments of this invention in which the bars 32 are not equally spaced, the members 35 may be dissimilar, in that it may be required to space the clips unequally to fit them properly on the associated bars.

In operation, a low resistance path is established from one of the input terminals 36 to one of the output terminals 36 in response to the application of a gas tube firing voltage across these two terminals. Application of firing potentials causes ionization of gas in the two crosspoint gas tubes which are connected in series via the common horizontal link conductor, thereby causing the resistance of this path to drop very substantially in magnitude. The remaining paths exhibit a high resistance to passage of current, since each remaining path contains one or more non-conducting (de-ionized) gas tubes. For example, if it were desired to complete a path from terminal 41 of the uppermost second row input member to terminal 45 of the ninth first-row output member, the source of ionizing potentials (not shown) would be connected between these two terminals, and a low resistance path would be established from terminal 41 through gas tube 42, link conductor 43 and gas tube 44 to terminal 45.

Each clip on a given rectangular member 35 is oriented similarly in order to provide the detachable feature to which reference was hereinbefore made. In the Fig. 3, any of the members 35 may be readily removed via motion in an inclined upward direction along the axis of the member. Members may be installed upon the bars by the reverse procedure, thus facilitating assembly and disassembly, the clips serving as both electrical connectors and physical clamps.

Figure 4:
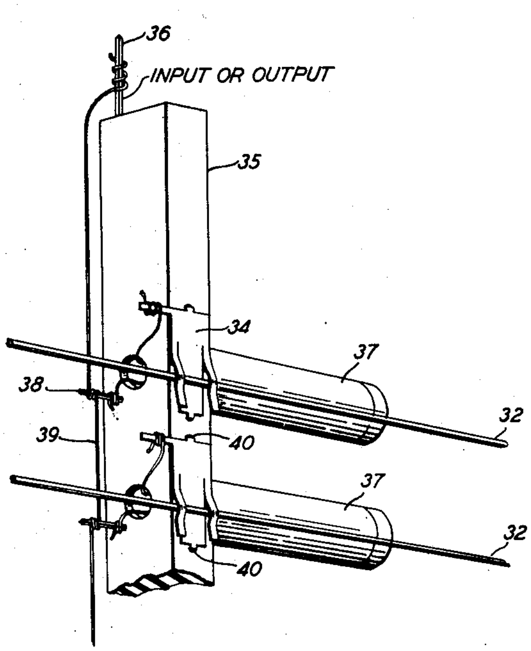
Fig. 4 is a detail view depicting clips and other structural features of the rectangular members shown in Fig. 3.

The input and output members are identical, and each comprises the following parts as noted more particularly in Fig. 4: a rectangular base 35 fabricated from any suitable insulating substance such as phenolic molding material, polystyrene, or impregnated fibre; ten switching type gas discharge tubes 37 which may be similar to those disclosed in the application for patent of M. A. Townsend, filed June 20, 1950, Serial No. 169,121; ten clips 34 fabricated from any suitably resilient conducting material such as Phosphor bronze; ten studs 38, one stud 36 of any suitable material such as Phosphor bronze, and suitable connecting wire 39. The studs 36 and 38 may be cast into the base member 35 or may be pressed therein, the clips may be attached by pressing the extending parts 40 into the member, and the gas tubes 37 may be forced into snugly fitting apertures (not shown), therein to be retained by frictional engagement.

The conductive metal bars 32 may be made from any suitable conductive material such as nickel silver, beryllium copper or Phosphor bronze. The insulating plates 33 may be fabricated from any insulating substance such as polystyrene, phenolic mounting material, or impregnated fibre; and the bars may be inserted through aligned apertures drilled therein.

Although the invention has been illustrated by a particular embodiment thereof, the invention is not limited to the specific apparatus and the particular arrangement therein disclosed. Various applications, modifications and arrangements of the invention will readily occur to those skilled in the art. For example, additional tiers of crosspoint devices may be added merely by extending the length of the embodiment of Fig. 3. Similarly, the gas tube crosspoint device could be replaced by transistors or other types of electro-connecting devices, in which case additional input and output terminals might be required on each member 35.

Also, the terms and expressions hereinbefore employed in reference to the invention are used as terms of description and not of limitation; and there is no intention in the use of such terms and expressions of excluding equivalents of the features shown and described or parts thereof, but on the contrary it is intended to include therein any and all equivalents, modifications and adaptations which may be employed without departing from the spirit of the invention.

What is claimed is:

1. A coordinate switch comprising in combination a first plurality of conductors arranged in groups in parallel planes, a second plurality of conductors arranged in an equal number of groups in parallel planes at right angles to said first-mentioned parallel planes, and means for establishing an electrical connection between any conductor in each one of said first-mentioned groups of conductors and any conductor in each one of said second-mentioned groups of conductors.

2. A coordinate switch according to claim 1 in which said electrical connection-establishing means comprises a plurality of electrical energy responsive elements severally connected between each one of said first plurality of conductors and each one of said second plurality of conductors.

3. A coordinate switch comprising a plurality of conductive bars rigidly secured in a predetermined configuration and in parallel relation, electronic devices supported on each of said bars each of said electronic devices having two electrodes, corresponding electrodes of each of said devices being connected to the bars supporting said devices, other corresponding electrodes of certain of said devices being commoned in one direction to form a plurality of input conductors, the same corresponding electrodes of certain other of said devices being commoned in another direction to form a plurality of output conductors, whereby in response to the application of a potential between one of said input conductors and one of said output conductors, one of said electronic devices connected to said one of said input conductors and one of said electronic devices connected to said one of said output conductors, operate to establish a connecting path between said one of said input conductors and said one of said output conductors over one of said conductive bars.

4. A coordinate switch comprising a plurality of conductive bars rigidly secured in the form of a square and in parallel relation, electronic devices supported on each of said bars, each of said electronic devices having two electrodes, corresponding electrodes of each of said devices being connected to the bars supporting said devices, other corresponding electrodes of certain of said devices being commoned in one direction of the square to form a plurality of input conductors, the same corresponding electrodes of certain other of said devices being commoned in the other direction of the square to form a plurality of output conductors, whereby in response to the application of a potential between one of said input conductors and one of said output conductors, an electronic device connected to said one of said input conductors and an electronic device connected to said one of said output conductors operate to establish a connecting path between said one of said input conductors and said one of said output conductors over one of said conductive bars.

5. A switch comprising in combination a plurality of conductive members, means to support said members in a predetermined configuration, a source of controlling potential, a first plurality of connecting members mounted in a direction athwart said conductive members and connected thereto, a second plurality of connecting members mounted in another direction athwart said conductive members and connected thereto, said connecting members each comprising a plurality of devices having two electrodes apiece and controllable from one electrical condition to another, means to support said devices, means to connect an electrode of each of said devices individually to certain of said conductive members, and means to connect said source of controlling potential to another electrode of each of said devices, whereby in response to the application of said controlling potential between said other electrodes of said devices supported upon one of said first plurality of connecting members and said other electrodes of said devices supported upon one of said second plurality of connecting members, one of said devices supported upon said one of said first plurality of said connecting members and one of said devices supported upon said one of said second plurality of said connecting members operate to establish a connecting path therebetween over one of said conductive members.

6. A switching member comprising a plurality of devices each having two electrodes and each controllable from one electrical condition to another, means to support said devices, means to make external electrical connections individually to an electrode of each of said devices, and means to make external electrical connections to another electrode of each of said devices.

7. A switching member according to claim 6 in which said devices comprise gas discharge tubes.

8. A switching member according to claim 7 in which said means to make external electrical connections individually to an electrode of each of said devices comprises a plurality of fasteners detachably connectable to a corresponding plurality of mating conductors.

9. A switching member according to claim 8 in which said means to make external connections to another electrode of each of said devices comprises a terminal commonly connected to each of said other electrodes of each of said devices.

10. A switch comprising in combination a plurality of electrical conductors, means for supporting said conductors in a predetermined configuration, a plurality of connecting members mounted athwart said conductors, each of said connecting members comprising a base, a plurality of switching elements mounted thereon, connectors associated with said switching elements to connect said switching elements to said conductors, means for connecting together said switching elements on each member, an input terminal connected to said connecting means on each of certain of said connecting members, and an output terminal connected to said connecting means on each of certain others of said connecting members, whereby in response to the application of a potential between one of said input terminals and one of said output terminals, a switching element connected to each of said terminals operates to establish a connecting path between said terminals over one of said conductors.

11. A switch comprising in combination a plurality of conductive bars, means for supporting said bars in longitudinally parallel relation, a plurality of connecting members mounted athwart said bars, each of said connecting members comprising a base, a plurality of switching elements mounted thereon, connectors associated with said switching elements to connect said switching elements to said bars, means for connecting together said switching elements on each member, an input terminal connected to the connecting means on each of certain of said connecting members, and an output terminal connected to the connecting means on each of certain others of said connecting members, whereby in response to the application of a potential between one of said input terminals and one of said output terminals, a switching element connected to each of said terminals operates to establish a connecting path between said terminals over one of said conductive bars.

12. A switch comprising in combination a plurality of conductive bars, means for supporting said bars in longitudinally parallel relation, a plurality of connecting members movably mounted on said bars transverse to the axes thereof, each of said connecting members comprising an insulating base, a plurality of switching elements mounted thereon, connectors associated with said switching elements to connect said switching elements to said bars, means for connecting together said switching elements on each member, an input terminal connected to the connecting means on each of certain of said connecting members, and an output terminal connected to the connecting means on each of certain others of said connecting members, whereby in response to the application of a potential between one of said input terminals and one of said output terminals, a switching element connected to each of said terminals operates to establish a connecting path between said terminals over one of said conductive bars.

13. A switch comprising in combination a plurality of conductive bars, means for supporting said bars in longitudinally parallel relation, and a plurality of connecting members movably mounted on said bars transverse to the axes thereof, each of said connecting members comprising an insulating base, a plurality of switching elements mounted thereon, connectors associated with said switching elements to connect said switching elements to said bars, means for connecting together said switching elements on each member, an input terminal connected to the connecting means on each of certain of said connecting members, and an output terminal connected to the connecting means on each of certain others of said connecting members, those connecting members having input terminals being mounted on said bars substantially in a plane at an angle to the axes of said bars, those connecting members having output terminals being mounted on said bars substantially in a second plane at an angle to the axes of said bars, the axes of those connecting members having input terminals being at an angle to the axes of those connecting members having output terminals, whereby in response to the application of a potential between one of said input terminals and one of said output terminals, a switching element connected to each of said terminals operates to establish a connecting path between said terminals over one of said conductive bars.

14. A device according to claim 13 in which said connecting members are arranged at right angles to the axes of said bars.

15. A device according to claim 14 in which the axes of certain of said connecting members are at right angles to the axes of others of said connecting members.

16. A device according to claim 13 in which said conductive bars are equally spaced.

17. A device according to claim 15 in which said conductive bars are equally spaced, and in which said switching elements comprise gas discharge tubes.

References Cited in the file of this patent

UNITED STATES PATENTS

| | | |
|---|---|---|
| 2,434,989 | Christian | Jan. 27, 1948 |
| 2,516,772 | Hickman | July 25, 1950 |